Figure 1:
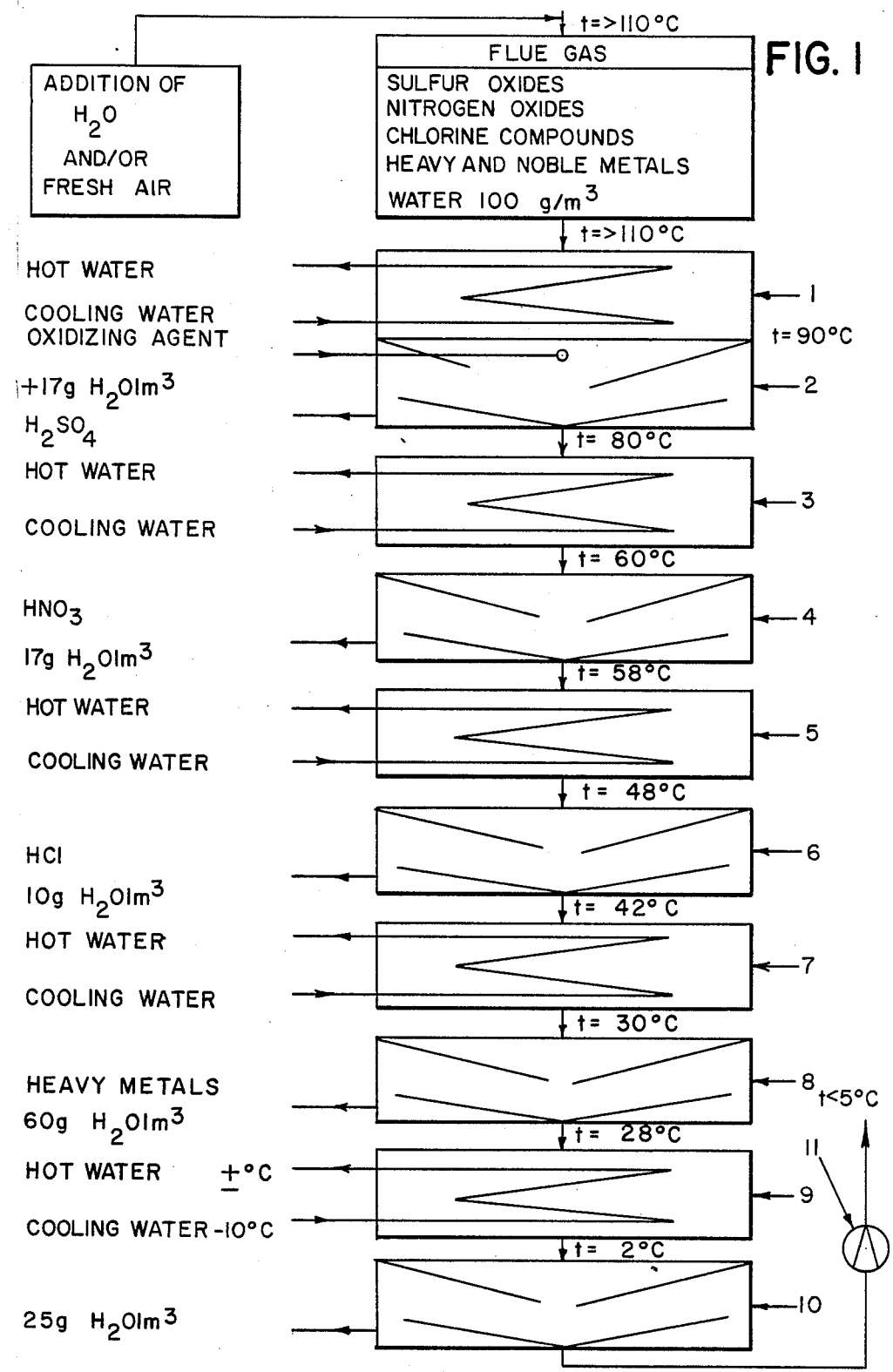

United States Patent [19]

Srednicki

[11] Patent Number: 4,783,326

[45] Date of Patent: Nov. 8, 1988

[54] PROCESS FOR THE REMOVAL OF POLLUTANTS FROM HOT GASES

[75] Inventor: Franz-Gerhard Srednicki, Brunswick, Fed. Rep. of Germany

[73] Assignee: ERA GmbH, Brunswick, Fed. Rep. of Germany

[21] Appl. No.: 932,505

[22] PCT Filed: Feb. 9, 1985

[86] PCT No.: PCT/EP85/00048

§ 371 Date: Oct. 9, 1986

§ 102(e) Date: Oct. 9, 1986

[87] PCT Pub. No.: WO86/04519

PCT Pub. Date: Aug. 14, 1986

[51] Int. Cl.$^4$ .................. C01B 17/00; C01B 21/00; B01D 47/00; B01J 8/00

[52] U.S. Cl. ..................... 423/242; 423/210; 423/235; 423/240; 423/390; 423/522

[58] Field of Search .............. 423/242 A, 242 R, 243, 423/244 A, 244 R, 522, 240 R, 235, 210, 390

[56] References Cited

U.S. PATENT DOCUMENTS

| | | | |
|---|---|---|---|
| 3,953,578 | 4/1976 | Thirion | 423/242 |
| 4,048,287 | 9/1977 | Kelleher et al. | 423/242 |
| 4,454,100 | 6/1984 | Faatz | 423/210 |
| 4,617,180 | 10/1986 | Vogg | 423/242 |

*Primary Examiner*—Gregory A. Heller
*Attorney, Agent, or Firm*—Foley & Lardner, Schwartz, Jeffery, Schwaab, Mack, Blumenthal & Evans

[57] ABSTRACT

A process for the removal of pollutants from hot flue gas is disclosed. The gas is cooled and at specified temperatures various acids are condensed out. After a further cooling, heavy metals are removed. Precise control of the quantity of water in the flue gas results in a purification process that is highly efficient. By adjusting the content of free oxygen in the flue gas, the addition of oxidizing agents used to remove sulfur dioxide can be considerably reduced.

11 Claims, 2 Drawing Sheets

PROCESS FOR THE REMOVAL OF POLLUTANTS FROM HOT GASES

The invention relates to a process for the removal of pollutants from hot gases, in which the gas is cooled and, at a specified temperature, a condensing out of acid is effected and the condensate removed, and in which, after a further cooling, heavy metals are removed with the condensate. The invention relates moreover to a purification plant for carrying out the process.

The invention is concerned in particular with the purification of flue gases. It is known that gases loaded with pollutants which reach the atmosphere represent a considerable pollution of the environment and cause considerable damage. The pollutants come back to earth, in particular along with drops of water, and contaminate the soil so that plants growing on the latter are poisoned or destroyed. This phenomenon is known as "acid rain".

The sulfur content of the exhaust gases, in particular, are held responsible for the acid rain. The desulfurization of flue gases is therefore known and is now stipulated for large furnace plants. For this purpose the gas is scrubbed, as a result of which sulfuric acid at high dilution is produced. Said sulfuric acid is extremely corrosive and handling it therefore presents considerable difficulties.

However, the desulfurization of flue gases has now also been recognized as inadequate. A substantial part of the injurious action of the acid rain is not to be ascribed to the sulfur content, but to the heavy metal content.

A process, described as the KOS process, has become known by which both sulfur dioxide and also heavy metals can be removed from the flue gas. For this purpose the flue gas is cooled, after which sulfuric acid is removed at a temperature above 60°. After a further cooling condensate is removed which contains heavy metals. After a final scrubbing of the gas, it is discharged into the atmosphere.

The KOS process consequently exploits the condensation of the moisture contained in the flue gas to remove pollutants from the flue gas. To facilitate condensation as sulfuric acid, an oxidizing agent in the form of hydrogen peroxide ($H_2 O_2$) is added to the flue gas before the precipitation of the sulfuric acid. This reinforces the oxidation of $SO_2$ to $SO_3$.

The KOS process offers the advantage that a heat recovery can be conducted as a result of the cooling of the flue gases.

In addition, the sulfuric acid produced in the condensation can also be commercially exploited.

The invention therefore relates to an improvement of the known process.

The invention is thus based on the object of developing the purification, mentioned in the introduction, of the hot gases from pollutants in a manner such that the purification takes place with a high efficiency regardless of the composition and the state of the hot gases.

This object is achieved according to the invention by a process wherein the moisture content of the hot gas is adjusted to a fixed value on entering the purification plant, wherein a controlled, step-wise cooling to various temperatures is undertaken at each of which a precipitation of condensate is undertaken, and wherein the particular precipitation takes place in each case slightly below the dew point of the particular acid formed by exhaust gas constituents with the condensate.

The invention is based on the discovery that it is important for the operation of the purification process that a relatively precisely defined quantity of water is present in the flue gas. If said quantity of water is not present, the efficiency of the purification drops considerably. It has emerged that, for the purification of flue gases which are introduced into the purification plant at a temperature of over 110° C., a water content of 100 $g/m^3$ $-15/+20$ $g/m^3$ is ideal. With this water content an adequate quantity of condensate is produced for the formation of the acid, and on the other hand the latter is not too greatly diluted as a result of too much water. As a result of the regulation of the moisture content of the hot gases it is possible to precipitate a multiplicity of acids in pure form and to undertake a very precise, step-wise cooling to various temperatures which are slightly below the particular dew point of the acid concerned.

It is therefore possible to precipitate not only sulfuric acid, but also nitric acid and hydrochloric acid in greatly concentrated form if the flue gas also contains nitrates and chlorine compounds.

As a result of the precise control of the moisture content, a very effective fractionated purification of the flue gas can be carried out.

Of course, the temperatures to which cooling takes place to precipitate condensate depend on the composition of the hot gases.

Special measures to prevent the formation of droplets when the cooled gases enter the atmosphere can be avoided if the flue gas is cooled to below 5° C. before discharging into the atmosphere and the condensate produced in this process is removed. The gas then has a moisture content which is markedly below the moisture content of the ambient air so that the possibility of drop formation with the gas can be completely ruled out.

In the case of sulfur-containing gases such as, for example, flue gases, it is advantageous to add an oxidizing agent to the gas for the purpose of precipitating sulfuric acid and to undertake the precipitation at approx. 90° C.

It has emerged that the degree of desulfurization cannot be raised above a certain limit even with an ample addition of oxidizing agents if the content of free oxygen in the exhaust gas is too low. In a preferred embodiment of the process according to the invention the content of free oxygen in the exhaust gas on entering the purification plant is therefore adjusted to at least 5% by volume. For a precipitation efficiency of more than 90%, the content of free oxygen should be more than 7.6% by volume and for a precipitation efficiency of 95% more than 12% by volume.

As a result of adjusting the content of free oxygen in the exhaust gas, the addition of oxidizing agents can be considerably reduced because $H_2SO_4$ is already formed as an aerosol in the exhaust gas due to numerous effects when adequate moisture is present. This means that a substantial part of the gaseous $SO_2$ has already been converted into $H_2SO_4$ in aerosol form on entering the purification plant. It has emerged that with an adequate content of free atmospheric oxygen the addition of oxidizing agents can even be completely dispensed with, precipitation efficiencies of more than 90% of the $SO_2$ being achieved. At any rate, the addition of oxidizing agents can be carried out very sparingly and in particular, always in a stoichiometric ratio to the sulfur content of the exhaust gas of $<0.5$. In many cases, even an addition in a stoichiometric ratio of 0.1 to 0.2 is sufficient to achieve a precipitation efficiency of virtually 100% if the content of free oxygen is set sufficiently high.

A precipitation of concentrated nitric acid should be undertaken at approx. 60° C. if the gas to be purified contains nitrate compounds.

If chlorine compounds exist, it is advantageous to undertake a precipitation of concentrated hydrochloric acid at approx. 45° C.

In the process according to the invention a high percentage of the heavy metals can be removed from the gas if a further precipitation of condensate is undertaken at approx. 30° C.

The invention is furthermore achieved by a purification plant for performing the process according to the invention if the purification plant has a measurement and regulation stage for the moisture content of the hot gas, a first heat exchanger for precisely defined cooling to a predetermined temperature, several further heat exchangers and a condensate precipitator downstream of the heat exchangers.

It is proposed to explain the invention in more detail below by reference to the exemplary embodiment shown in the drawing.

FIG. 1 shows a flow chart for a flue-gas purification according to the invention. The flue gas, which normally contains sulfur oxides, nitrogen oxides, chlorine compounds, and heavy and noble metals, has a temperature of >110° C. on entering the purification plant. Adding water or fresh air ensures that the hot gas has a water content of 100 g/m$^3$ and the proportion of free oxygen in the exhaust gas is at least 5% by volume. The gas then passes through a heat exchanger 1 which cools the gas to approx. 90° C. Downstream of the heat exchanger 1 is a precipitator 2 into which an oxidizing agent such as, for example, hydrogen peroxide ($H_2O_2$) dissolved in water, is introduced. The sulfur dioxide still contained in the flue gas is oxidized by the oxidizing agent to sulfur trioxide ($SO_3$) and forms sulfuric acid ($H_2SO_4$). The sulfuric acid is removed in concentrated form, in which it is only slightly corrosive, and can be supplied for a further use. At the output of the precipitator 2 the gas has a temperature of approx. 80° C. In a further heat exchanger 3, the gas is cooled to approx. 60° C. and fed to a further precipitator 4 in which nitrate compounds form nitric acid ($HNO_3$) with the condensate. The nitric acid is likewise produced in concentrated form and is removed. The warm gas at about 58° C. at the output of this stage is cooled in a further heat exchanger 5 to approx. 48° C. and fed to a precipitator 6 in which concentrated hydrochloric acid is produced. After a further cooling in a heat exchanger 7, heavy metals are precipitated with condensate in a precipitator 8 at about 30° C.

The flue gas is now virtually completely purified. Depending on the removal of sulfur oxides by the addition of oxidizing agents and the precipitation in precipitator 2, the gas may contain a residual component of sulfur dioxide. Thi can be scrubbed out of the gas by a conventional method after cooling to approx. 30° C. has been carried out.

As provided for in an advantageous embodiment of the process, however, it will in general be sufficient to cool the gas in a further heat exchanger stage 9, which is preferably charged with coolant, to aboct its freezing point (+2° C.) and to remove the condensate in a final precipitator 10, as a result of which the gas is virtually completely dried. It may now be discharged, if required, via a fan 11 into the atmosphere, it having a temperature of less than 5° C.

The dry gas does not form any droplets in the vicinity of the outlet point since the hum dity of the ambient temperature (sic) is certainly higher. Higher pollution of the immediate vicinity of the gas exhaust point does not therefore result so that residual pollutant concentrations can even be accepted because they do not precipitate in a small spatial region.

Of course, it is possible to dispense with the first cooling stage when treating sulfur-free gases and to cool the gas immediately to 60° C. to precipitate nitric acid. The only important point is that at least the first heat exchanger can be regulated in order that, with various gas outlet temperatures, the required, specified temperature can be achieved. The regulation of the heat exchanger 1 or 3 may be performed by controlling a control valve by means of a temperature measuring element and regulating the quantity of cooling water which flows into the heat exchanger 1 or 3. Moreover, it is possible, if other pollutants are present, to provide for precipitation at a completely different temperature in order to extract another acid.

The process according to the invention makes it possible to extract very pure acids because the condensation can be very precisely fractionated due to the adjustment of the humidity of the flue gas. The sulfuric acid extracted is therefore not contaminated with nitric acid, and the nitric acid extracted is not contaminated with hydrochloric acid, etc.

The cooling circuits automatically extract warm water, the heat of which can be used for a wide variety of purposes so that an automatic heat recovery takes place. The process shown therefore proves to be extremely economic.

It has emerged that, with a moisture content of over 120 g/m$^3$ and below 85 g/m$^3$, the desulfurization drops below 85%.

Figure 2:
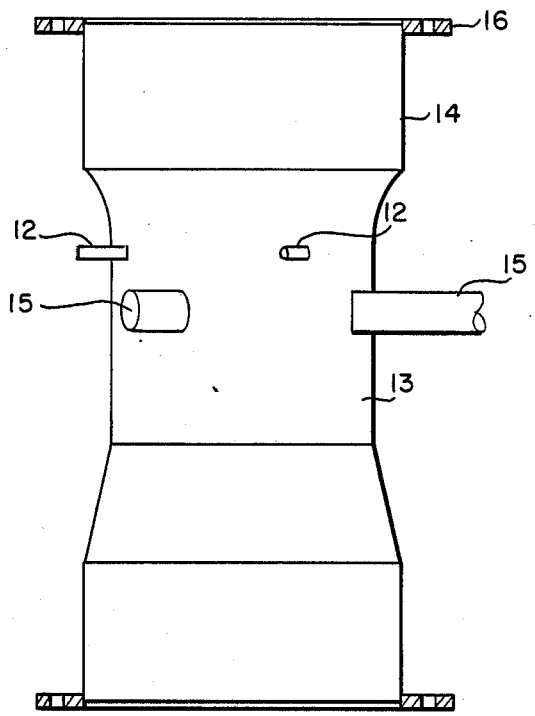
Figure 3:
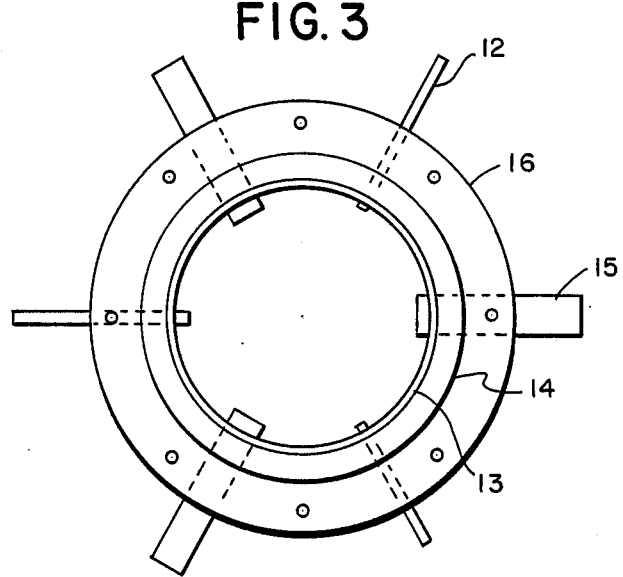

FIG. 2 shows the arrangement of pipelines for supplying fresh air containing free oxygen and water to the exhaust gas upstream of the first heat exchanger 1. A supply pipeline 12 for fresh air is situated at the position of a constriction 13 in an exhaust gas pipeline 14. The constriction forms a type of Venturi tube in which the exhaust gas is compressed. Because of the reduction in the pressure of the exhaust gas due to the enlargement of the pipeline downstream of the constriction 13, the addition of fresh air via the supply pipeline 12 at this point leads to a thorough mixing of the fresh air with the exhaust gas. Supply pipelines 15 for the water may also be provided in the region of the constriction in order to adjust the water content of the exhaust gas in the required manner.

The plan view of a connecting flange 16 of the exhaust gas pipeline 14 in FIG. 2 shows clearly that the supply pipelines 12 and 15 debouch into the latter uniformly distributed over the circumference of the exhaust gas pipeline 14, which contributes to a uniform mixing of the fresh air supplied or of the water supplied.

I claim:

1. A process for the removal of pollutants from hot gases, said pollutants including at least sulfur oxides and one member selected from the group consisting of nitrogen oxides, hydrochloride and heavy metals, comprising the steps of:

adjusting the content of free oxygen in the gas at a temperature between 100° C. and 150° C. to at least 5% by volume;

adjusting the water content of the gas to 85–120 g/m³ when it enters the purification plant;

thereafter adding an oxidizing agent to the gas in measured amounts such that a stoichiometric ratio <0.5, referred to the sulfur content of the gas is produced;

cooling the gas to a temperature of approx. 90° C. and drawing off condensed sulfuric acid; and cooling the gas in at least one further stage below the saturation point of water vapor and drawing off condensate with pollutant.

2. The process according to claim 1, characterized in that the gas is introduced into the purification plant at a temperature above 110° C. .

3. The process as claimed in claim 1, wherein the further cooling stage comprises a precipitation of concentrated hydrochloric acid undertaken at about 45° C. .

4. The process as claimed in claim 1, wherein the further cooling stage comprises a precipitation of condensate undertaken at about 30° C. .

5. The process as claimed in claim 1, wherein the further cooling stage comprises a precipitation of condensation undertaken at about the freezing point of the gas.

6. The process as claimed in claim 1, wherein the flue gas is cooled to below 5° C. before discharging into the atmosphere.

7. The process as claimed in claim 1, wherein the oxygen to ajust the free oxygen content is added after compressing the exhaust-gas flow and wherein the pressure of the exhaust gas flow is expanded again after adding the oxygen.

8. The process as claimed in claim 1, wherein the further cooling stage comprises a precipitation of concentrated nitric acid undertaken at approx. 60° C. .

9. The process as claimed in claim 8, wherein the further cooling stage additionally comprises a precipitation of concentrated hydrochloric acid undertaken at approx. 45° C.

10. The process as claimed in claim 9, wherein the further cooling stage additionally comprises a further precipitation of condensate undertaken at approx. 30° C.

11. The process as claimed in claim 10, wherein the further cooling stage additionally comprises a final precipitation of condensate undertaken at about the freezing point of the gas.

* * * * *